Sept. 14, 1926.　　　　J. VAN MOHR　　　　1,599,599
RESILIENT WHEEL
Filed July 23, 1923　　　2 Sheets-Sheet 1
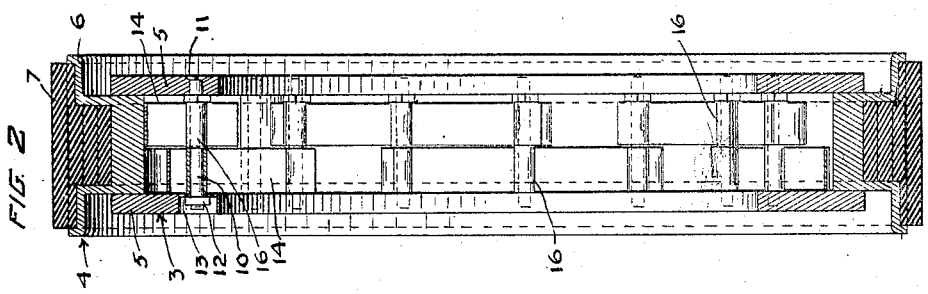
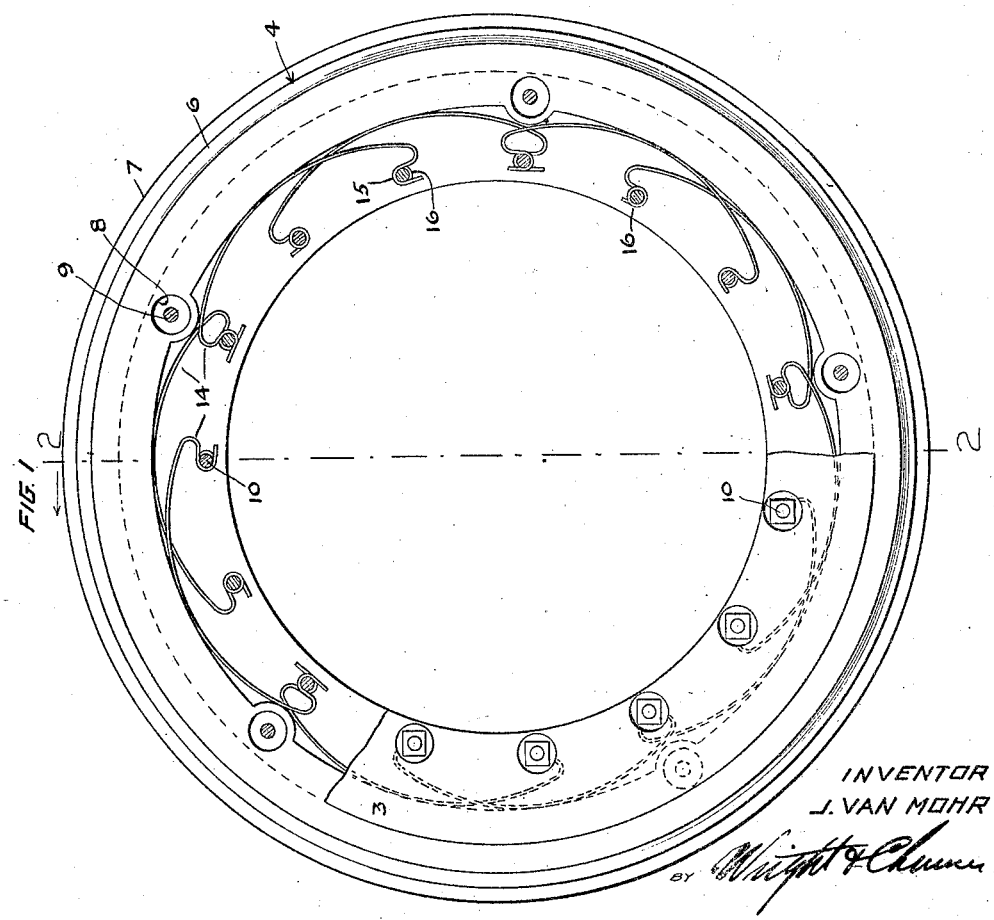
INVENTOR
J. VAN MOHR
BY
ATT'YS.

Sept. 14, 1926.  J. VAN MOHR  1,599,599
RESILIENT WHEEL
Filed July 23, 1923   2 Sheets-Sheet 2
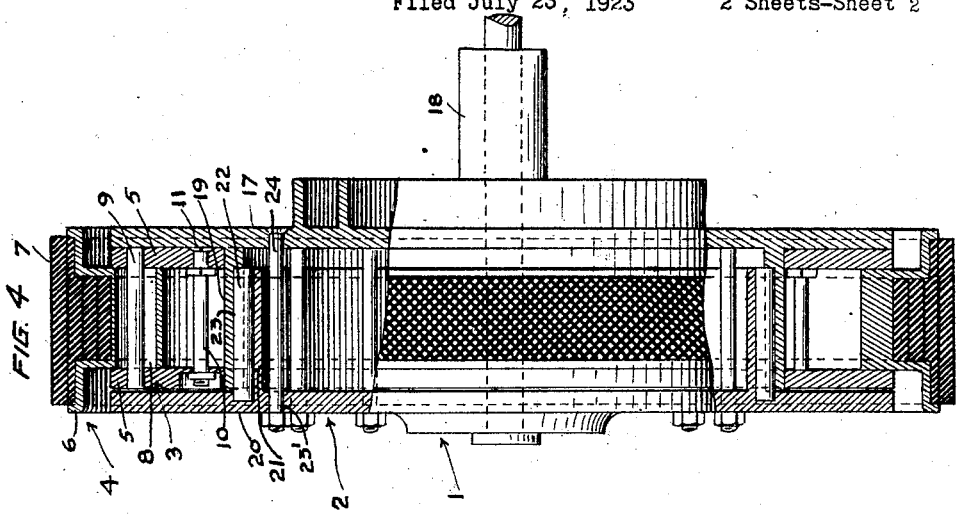
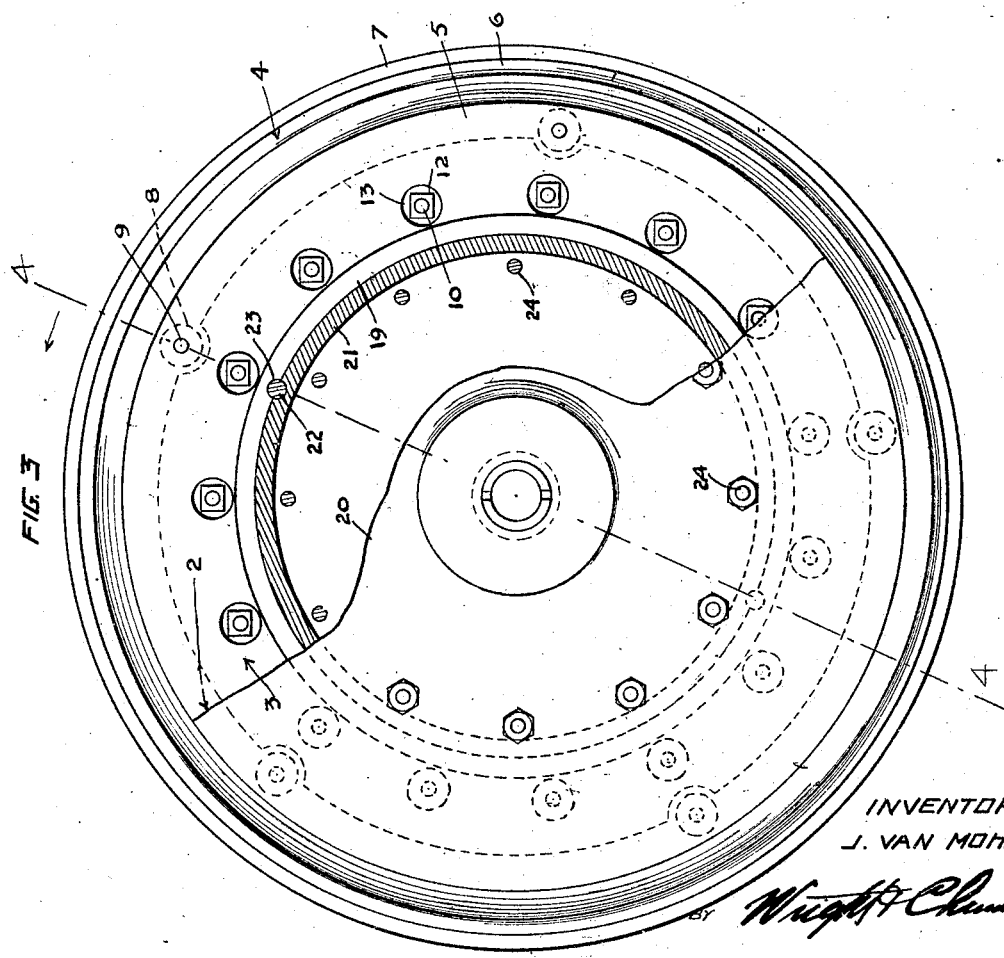
INVENTOR
J. VAN MOHR
ATT'YS.

Patented Sept. 14, 1926.

1,599,599

UNITED STATES PATENT OFFICE.

JOSEPH VAN MOHR, OF SAN FRANCISCO, CALIFORNIA.

RESILIENT WHEEL.

Application filed July 23, 1923. Serial No. 653,193.

The present invention relates to improvements in resilient vehicle wheels and resides in the provision of a simply constructed, strong, durable and comparatively inexpensive wheel of this character which permits of the use of solid instead of pneumatic tires and yet effectively absorbs road shocks and jars.

An object of the invention is to provide a resilient wheel of the character described which through use of a novel spring arrangement between the rim and hub provides sufficient resiliency to permit of the use of solid tires with the result that punctures, blow-outs and the other objections attending the use of pneumatic tires are eliminated and the expense of upkeep is comparatively less.

Another object is to provide a wheel of the character described which is of novel sectional construction whereby the assembling and disassembling thereof is facilitated and the replacement of worn or broken parts may be readily and easily effected.

A further object of the invention is to provide a sectional resilient wheel wherein the outer section, in case it becomes broken or damaged, may be readily removed and a new outer section quickly mounted on the inner section with substantially the same facility and expediency as would be the case in replacing a rim and tire on an ordinary automobile wheel.

With the above mentioned and other objects in view, the invention consists in the novel construction and combination of parts hereinafter described, illustrated in the accompanying drawings, and set forth in the claim hereto appended, it being understood that various changes in the form, proportion, size and minor details of construction within the scope of the claim may be resorted to without departing from the spirit or sacrificing any of the advantages of the invention.

Referring to the drawings:

Fig. 1 is a side elevation of the rim and tire unit of my wheel, showing parts broken away and other parts in section.

Fig. 2 is a vertical sectional view taken on line 2—2 of Fig. 1.

Fig. 3 is a side elevation partly broken away and in section of the assembled wheel.

Fig. 4 is an edge view partly broken away and in section of the same, the section being taken on line 4—4 of Fig. 3.

In the embodiment of the invention shown in the accompanying drawings, the wheel comprises a hub 1, an inner wheel section 2, an outer wheel section 3 and a floating rim 4 mounted on the outer section.

The outer section 3 comprises two annular plates 5 between which the rim 4 is slidably movable, said rim having laterally flared portions 6 and contains as shown, a laminated solid cushion tire 7. The rim is provided with transverse openings 8 through which pins 9 of considerably less diameter than said openings are extended. Said pins are anchored or secured in any suitable manner at their ends to and extend between said plates 5.

Bolts 10 extend through the plates at points spaced inwardly from the inner side of the rim and have heads 11 countersunk in one of the plates 5 and nuts 12 on their other ends counter-sunk in openings 13, in the other plate. These bolts hold the plates 5 assembled and provide means for securing the spring devices in place.

A plurality of bowed leaf springs 14 are mounted on the bolts 10 and contact with the inner face of the rim 4 so as to provide for yieldingly supporting the rim. These members 14 are each bent back upon themselves at their ends to provide inwardly offset hooks 15 which open laterally and are adapted to be snapped over and to receive the bolts 10 as shown in Fig. 1. Any number of these springs may be employed but preferably they are arranged so that one spring will span three bolts. Thus, by mounting one of the hooks 15 of a spring, on one bolt, the spring is extended past the next adjacent bolt and the other hook is snapped onto the next bolt. As above stated any number of springs may be used and this requires a variation of the number of bolts 10 employed. The convex sides of the springs contact with the inner side of the rim. Sufficient space is provided around the pins 9 in the openings 8 and between the inner side of the rim and bolts 10 to permit of an effective relative movement between the rim and outer wheel section. The springs are set in place so as to be at all times under compression, whether or not a load is placed upon the wheel. Due to the hooks 15, the springs may be readily and easily mounted in place or removed and replacement of broken springs may therefore be easily effected. The springs are substantially half the width of the space between the plates 5 and in instances where but one spring is fastened to a bolt 10, the sleeve 16 is employed on the bolt to prevent sidewise movement of the spring.

The outer wheel section 3 and rim 4 with the springs and other parts associated therewith comprises a unit corresponding to a spare tire unit as now generally employed, in that this unit may be readily removed from the inner wheel section and a new, similar unit mounted in place. The inner wheel section 2 comprises an inner circular plate 17 which is associated with the hub 1 and axle housing 18 in the usual manner and has an annular laterally extending flange 19 extending from its outer side. The outer wheel section 3 is adapted to rest upon the outer periphery of the flange 19. The periphery of the inner plate 17 lies flush with the outer peripheries of the annular plates 5. An outer circular plate 20, of the same diameter as plate 17, is mounted on the outer side of the wheel and is provided with a similar annular flange 21 adapted to be telescoped by the flange 19. The flange 21 is provided with transverse grooves in which are seated pins 22 arranged to engage in grooves 23 in the flange 19 so as to hold the plates against relative circumferential movement and to bring the bolt holes 23' in proper alinement. Bolts 24 are extended through the plates 17 and 20 so as to hold the plates in place. The lateral extensions 6 of the rim provide that the rim shall be substantially as wide as, if not slightly wider than, the body of the wheel and the space between this pair of flanges and the outer peripheries of the plates 17, 20 and 5 is sufficient to permit of the relative movement between the rim and wheel section 3. It will be seen that no matter how the load is applied to the wheel, the springs will compress evenly and provide for a proper cushioning or resilient action to absorb shocks or jars in an effective manner. The springs being at all times under compression will prevent rattling of the parts.

I claim:

A resilient wheel comprising an inner wheel section, an outer wheel section removably mounted upon the inner wheel section and comprising spaced annular plates, bolts for holding said plates assembled, a rim surrounding the outer wheel section and having a portion thereof extending between said plates, said portion of the rim having openings therein, members fastened to the plates and extending through said openings, which members are of considerably less diameter than the diameter of the openings, bowed springs having their ends attached to said bolts and contacting between their ends with the inner face of the rim, said springs being at all times under compression, said inner wheel section comprising inner and outer plates between which the outer wheel section is disposed and an annular flange on one of said last named plates against and upon which the plates of the outer wheel section extend and means for holding said inner wheel section plates assembled.

JOSEPH VAN MOHR.